May 22, 1923.
O. RAMSEY
SAW SHARPENER
Filed April 4, 1922
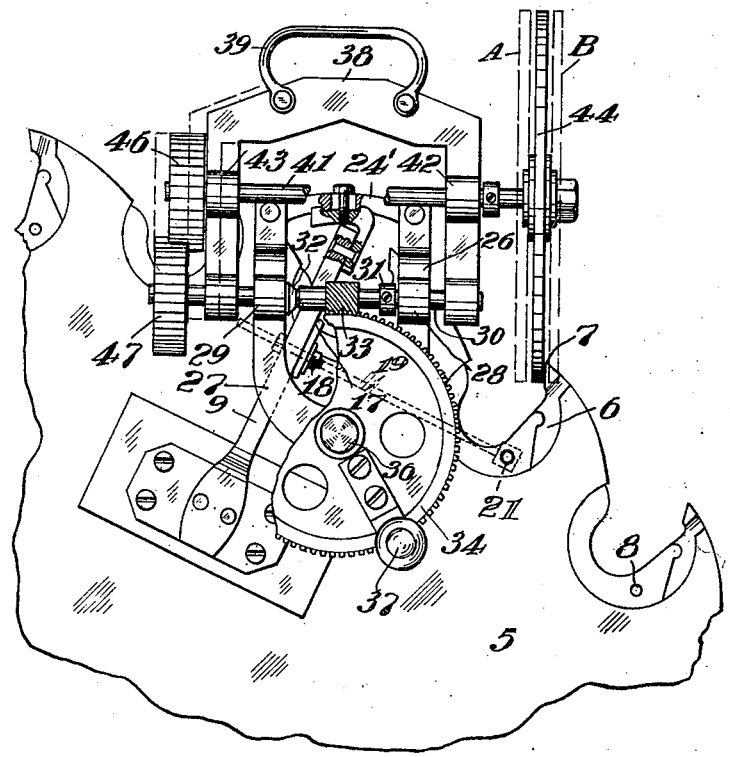
Fig. I
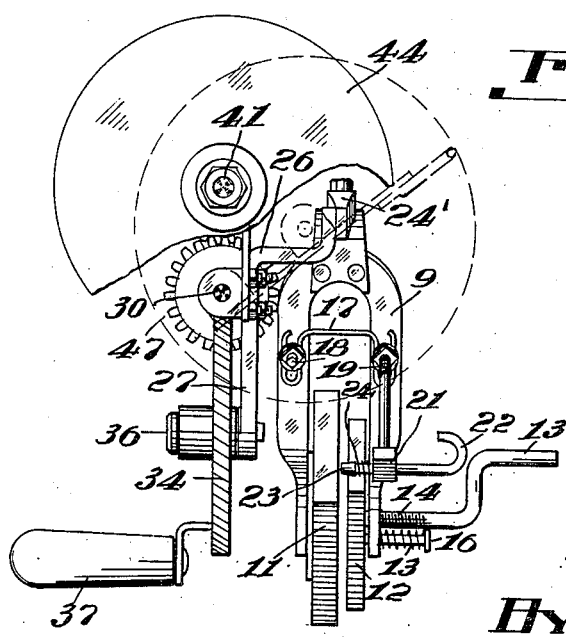
Fig. II
INVENTOR
O. RAMSEY
BY Victor J. Evans.
ATTORNEY Patented May 22, 1923.

1,456,402

UNITED STATES PATENT OFFICE.

OSCAR RAMSEY, OF ANLAUF, OREGON.

SAW-SHARPENER.

Application filed April 4, 1922. Serial No. 549,647.

*To all whom it may concern:*

Be it known that I, OSCAR RAMSEY, a citizen of the United States, residing at Anlauf, in the county of Douglas and State of Oregon, have invented new and useful Improvements in Saw Sharpeners, of which the following is a specification.

This invention relates to improvements in saw sharpeners, and relates particularly to a saw sharpener adapted to be employed with large circular saws of the type having removable teeth.

The principal object of this invention is to produce a sharpener which may be moved around the periphery of a saw and successfully brought into contact with the various teeth, thereby causing an accurate sharpening of each tooth which cannot be accomplished in hand filing.

Another object of this invention is to produce a device of the above mentioned character which is simple in construction, and one which may be operated by an unskilled filer.

Another object is to produce a machine wherein all of the teeth will receive a grinding of an equal angle.

A further object is to produce a grinder wherein the simplicity of construction will allow of a low selling price.

Other objects and advantages will be apparent during the course of the following description.

In the accompanying drawings forming a part of this specification, and in which like numerals are employed to designate like parts throughout the same, Figure 1 is a fragmentary section of a saw with my device applied thereto, and Figure 2 is a side elevation with my device removed from the same and looking in the direction of the arrow of Figure 1.

Up to the present time, as far as applicant is aware, it has been customary to re-sharpen large circular saws either by hand or by an expensive filing machine. The expense of the filing machine was prohibitive for a small mill and the hand filing was a tedious and very inaccurate method, with the result that a hand filed saw would not cut straight and in many instances would tend to run out. I overcome this difficulty by devising a simple hand operated grinding device which may be applied to the saw and successfully brought into contact with each tooth.

In the accompanying drawings wherein for the purpose of illustration is shown a preferred embodiment of my invention, the numeral 5 designates a saw having the usual removable tooth 6, which tooth has a chisel edge 7. The construction of these teeth is well known and needs no further description. The holding member for each tooth is provided with an opening 8 as shown in Figure 1. At 9 I have shown a substantially U shaped member which is adapted to straddle the saw as is shown in Figure 1. This U shaped member carried on one of its extremities a block 11 and upon its opposite extremity a block 12. The block 12 is movable to or away from the lower extremity by a crank 13 threaded as at 14 through the lower extremity of the U shaped member 9. A pin 16 having a spring 13 coiled thereabout, is also attached to the block 12 and serves to act as a guide for this block. At 17 I have shown a gauge member which is adapted to be secured at its extremities to the U shaped member 9 as shown by bolts 18 and 19. The bolt 19 is elongated and provided with a head 21 which head has slidably held therein a latch member 22 which is provided at one end with a bent portion and at its opposite end with a head 23. A coiled spring 24 abuts the head 21 and the head 23. Secured on the U shaped member 9 is a cross piece 24' to which is secured offset members 26 which carry a depending frame 27 of a substantially U shaped configuration. Secured upon this last mentioned member 27 are journals 28 and 29 which journals carry a shaft 30. This shaft 30 is prevented from lateral movement as by collars 31 and 32. A worm 33 is centrally mounted upon this shaft and is adapted to engage a worm gear 34 rotatably secured upon the lower extremity of the member 27 as by a pivot pin 36. A handle 37 is provided for rotating this worm gear 34. Mounted upon the shaft 30 and at a point spaced beyond the margins of the member 27 is a yoke shaped member 38. A handle 39 is secured to this yoke 38 and serves as a medium for moving this yoke laterally on the shaft 30 as will later be seen. A shaft 41 is journalled as at 42 and 43 in the yoke 38 and carried on one end a cutting disc 44 and at its opposite end a gear 46 which gear is adapted to mesh with a gear 47 mounted upon the extremity of the shaft 31.

The operation of my device is as follows:—

The U shaped member 9 is placed over the saw as shown in Figure 1 and the guide 17 is caused to rest in the channel of the tooth. The head 23 carried on the end of the bolt 19 is caused to engage the hole 8 of the tooth and the adjusting nuts are tightened at the proper point. After this adjustment is made, it is maintained during the grinding of all of the teeth of the saw. It is assumed that the blocks 11 and 12 have been tightened against the surface of the saw. By then rotating the handle 38, motion is transmitted through the worm gear 34, worm 33, shaft 30, gear 47, to gear 46. This motion is in turn transmitted through shaft 41 to grinder 44. By grasping the handle 39 the yoke 38 may be slid laterally of the shaft 31, and the grinder may be brought from the dotted line position A of Figure 1 against the saw tooth as shown in the full line and may be moved on to the dotted line position of Figure 1, the amount of movement being sufficient to place an edge upon the tooth. It will be noted, however, that the angle of the teeth is at all times maintained therein and uniform cutting of the saw will result.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, a substantially U-shaped frame adapted to engage the opposite sides of a saw, a depending substantially U shaped member secured to said first mentioned U shaped member, a worm gear mounted thereon, means for rotating said worm gear, a shaft secured on said second mentioned U shaped frame, a worm mounted on said shaft and adapted to be rotated by said worm gear, a yoke supported on said shaft, a grinding wheel supported on said yoke and adapted to be rotated by said first mentioned shaft.

In testimony whereof I affix my signature.

OSCAR RAMSEY.